(12) United States Patent
Gong et al.

(10) Patent No.: US 10,372,959 B2
(45) Date of Patent: Aug. 6, 2019

(54) FINGERPRINT IDENTIFICATION APPARATUS

(71) Applicant: SHENZHEN GOODIX TECHNOLOGY CO., LTD., Shenzhen, Guangdong (CN)

(72) Inventors: Cai Gong, Guangdong (CN); Lyu Hou, Guangdong (CN); Wei Long, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 69 days.

(21) Appl. No.: 15/697,763

(22) Filed: Sep. 7, 2017

(65) Prior Publication Data

US 2018/0204041 A1    Jul. 19, 2018

Related U.S. Application Data

(63) Continuation of application No. PCT/CN2017/071652, filed on Jan. 19, 2017.

(51) Int. Cl.
    *G06K 9/20*    (2006.01)
    *G06K 9/00*    (2006.01)
    *G06K 9/22*    (2006.01)

(52) U.S. Cl.
    CPC ......... *G06K 9/00013* (2013.01); *G06K 9/001* (2013.01); *G06K 9/0002* (2013.01);
    (Continued)

(58) Field of Classification Search
    CPC .......... G06K 9/00013–9/0012; G06K 9/00006
    See application file for complete search history.

(56) References Cited

U.S. PATENT DOCUMENTS

| 4,810,411 A | 3/1989 | Del Pesco et al. |
| 2014/0220345 A1* | 8/2014 | Lin ........................ C09D 5/031 428/402 |

(Continued)

FOREIGN PATENT DOCUMENTS

| CN | 104051366 A | 9/2014 |
| CN | 104156105 A | 11/2014 |

(Continued)

OTHER PUBLICATIONS

State Intellectual Property Office of the P.R. China (ISR/CN), "International Search Report for PCT/CN2017/071652", China, dated Oct. 18, 2017.

(Continued)

*Primary Examiner* — Brian Werner
(74) *Attorney, Agent, or Firm* — Heslin Rothenberg Farley & Mesiti P.C.

(57) ABSTRACT

The present disclosure relates to the technical field of biometric identification, and in particular, a fingerprint identification apparatus. The fingerprint identification apparatus includes: a substrate, a sensing chip, a first covering layer, and a second covering layer; wherein the sensing chip is arranged on the substrate, the first covering layer is coated over the sensing chip, the second covering layer is coated on an upper surface of the first covering layer, and the second covering layer is an oleophobic and hydrophobic coating. In the fingerprint identification apparatus according to the embodiment of the present disclosure, a hydrophobic and oleophobic coating is arranged on the surface of the fingerprint identification apparatus, where the density of the hydrophobic components is increased and the hydrophobic as well as oleophobic capabilities are enhanced, and thus the fingerprint identification accuracy and fingerprint identification speed in a wet-finger use environment are improved.

7 Claims, 4 Drawing Sheets

(52) U.S. Cl.
CPC ....... *G06K 9/0008* (2013.01); *G06K 9/00053* (2013.01); *G06K 9/00087* (2013.01); *G06K 9/209* (2013.01); *G06K 9/22* (2013.01)

(56) References Cited

U.S. PATENT DOCUMENTS

| | | | | |
|---|---|---|---|---|
| 2015/0259565 | A1* | 9/2015 | Veya | B41M 7/0045 428/196 |
| 2016/0125220 | A1* | 5/2016 | Lundahl | G06K 9/0002 382/124 |
| 2018/0129851 | A1* | 5/2018 | Hsu | H01L 21/00 |

FOREIGN PATENT DOCUMENTS

| | | | |
|---|---|---|---|
| CN | 106339125 | A | 1/2017 |
| EP | 1316913 | A2 | 6/2003 |
| JP | 3455459 | B2 | 10/2003 |
| WO | 0136905 | A1 | 5/2001 |
| WO | 2016146895 | A2 | 9/2016 |

OTHER PUBLICATIONS

Extended European Search Report for European Patent Application No. 17758789 dated Oct. 2, 2018.

\* cited by examiner

FINGERPRINT IDENTIFICATION APPARATUS

CROSS-REFERENCE TO RELATED APPLICATIONS

The present application is a continuation of international application No. PCT/CN2017/071652, filed on Jan. 19, 2017, which is incorporated herein by reference in its entirety.

TECHNICAL FIELD

The present disclosure relates to the technical field of biometric identification, and in particular, relates to a fingerprint identification apparatus.

BACKGROUND

With the development of technologies, the fingerprint identification technology has become a standard configuration of most smart phones. A fingerprint identification process includes: acquiring an original fingerprint image by using a fingerprint identification module, then performing feature point matching between the original fingerprint image and a registered fingerprint profile, and unlocking or performing an instruction and the like operations upon successful matching.

At present, fingerprint identification apparatuses on the market have poor hydrophobic and oleophobic properties, and thus the fingerprint identification effect is affected during use due to such factors as moisture, sweat or oil stains on the finger (which is hereinafter referred to as a wet finger). As such, the fingerprint identification accuracy and fingerprint identification speed of the fingerprint identification apparatuses in a use environment such as the wet finger or the like are lowered, or even the fingerprints fail to be identified.

FIG. 1 to FIG. 3 illustrates the fingerprint detection principle. FIG. 1 is a schematic principle diagram of fingerprint detection by a conventional fingerprint identification apparatus for a dry finger. FIG. 2 is a schematic principle diagram of fingerprint detection by the conventional fingerprint identification apparatus for a wet finger. FIG. 3 is a schematic diagram of a water drop angle/a sweat drop angle of fingerprint detection by the conventional fingerprint identification apparatus for a wet finger. A sensing chip of the fingerprint identification apparatus is formed of a matrix electrode plate. The electrode plate forms a capacitance with finger patterns. A capacitance CV of the ridge pattern on the finger to the electrode plate is different from a capacitance CR of the valley pattern on the finger to the electrode plate. The fingerprint image is recovered by detecting the values of the capacitances. However, when a wet finger is pressed on the surface of a coating, the valleys of the fingerprints is filled with the water, sweat or oil stains on the finger, and the water sweat or oil stains on the wet finger may be spread on the surface of the coating. Since the water drop angle/or the sweat drop angle is small, the contact area between the water, sweat or oil stains on the finger and the surface of the coating is relatively larger, and thus the affected sensing region is larger, such that the fingerprint image may not be clearly recovered or fails to be recovered. This affects the fingerprint identification accuracy and fingerprint identification speed of the finger.

SUMMARY

Embodiments of the present disclosure provide a fingerprint identification apparatus to solve the problems that a conventional fingerprint identification apparatus has poor hydrophobic and oleophobic properties, and the fingerprint identification accuracy and the fingerprint identification speed are low for a wet finger.

In order to solve the above problem, embodiments of the present disclosure employ the following technical solution:

A fingerprint identification apparatus is provided, including: a substrate, a sensing chip, a first covering layer, and a second covering layer; wherein the sensing chip is arranged on the substrate, the first covering layer is coated over the sensing chip, the second covering layer is coated on an upper surface of the first covering layer, and the second covering layer is an oleophobic and hydrophobic coating.

In the technical solution employed by embodiments of the present disclosure, the second covering layer is made from a fluoropolymer.

In the technical solution employed by embodiments of the present disclosure, the second covering layer is prepared by: mixing a raw liquid of the fluoropolymer with a solvent dipropylene glycol methyl ether at a ratio, and then uniformly spraying or evaporating the mixture on the upper surface of the first covering layer and fully curing the mixture to form the second covering layer.

In the technical solution employed by embodiments of the present disclosure, the raw liquid of the fluoropolymer and the solvent dipropylene glycol methyl ether are mixed at a ratio of 0.5 to 5:100.

In the technical solution employed by embodiments of the present disclosure, the second covering layer has a thickness of several nanometers to several tens of nanometers.

In the technical solution employed by embodiments of the present disclosure, the first covering layer includes a surface hardened layer or a cover.

In the technical solution employed by embodiments of the present disclosure, when the first covering layer is a surface hardened layer, a paint for preparing the surface hardened layer is added with a hydrophobic and oleophobic material.

In the technical solution employed by embodiments of the present disclosure, when the first covering layer is a surface hardened layer, the hydrophobic and oleophobic materials added to a paint for preparing the surface hardened layer includes a silicone-modified resin or an organic fluorine-modified resin.

In the technical solution employed by embodiments of the present disclosure, when the first covering layer is a surface hardened layer, the first covering layer is prepared by: mixing the hydrophobic and oleophobic material with an inhibitor 4-methoxyphenol at a ratio and adding the mixture into the paint for preparing the surface hardened layer, and coating the paint with the mixture over the sensing chip and fully curing the paint with the mixture, to form the first covering layer.

In the technical solution employed by embodiments of the present disclosure, the hydrophobic and oleophobic material, the inhibitor 4-methoxyphenol and the paint of the surface hardened layer are mixed at a ratio of 1 to 5:20:100.

In the technical solution employed by embodiments of the present disclosure, the fingerprint identification apparatus further includes a plastic packaging material; wherein the sensing chip is packaged on the substrate using the plastic packaging material.

As compared with the prior art, the embodiments of the present disclosure achieve the following beneficial effects:

In the fingerprint identification apparatus according to the embodiment of the present disclosure, a hydrophobic and oleophobic coating is arranged on the surface of the fingerprint identification apparatus or a hydrophobic and oleophobic material is added to the paint for preparing the surface hardened layer, such that the density of the hydrophobic components on the surface of the fingerprint identification apparatus is increased. In this way, the hydrophobic and oleophobic capabilities of the surface of the fingerprint identification apparatus are enhanced, and thus the fingerprint identification accuracy and fingerprint identification speed in a wet-finger use environment are improved.

DETAILED DESCRIPTION

In order to facilitate understanding of the present disclosure, the present disclosure will be described more comprehensively with reference to relevant drawings.

The accompanying drawings show preferred embodiments of the present disclosure. However, the present disclosure may be implemented in a plurality of forms or ways, and is not limited to the embodiments described herein. On the contrary, these embodiments are provided to make the understanding of the disclosed contents of the present disclosure more thorough and comprehensive.

Unless otherwise defined, all the technical and scientific terms used in this specification are the same as those usually understood by persons skilled in the art of the present disclosure. The terms in the specification of the present disclosure are only used to describe the specific embodiments, but not to limit the present disclosure.

Figure 1:
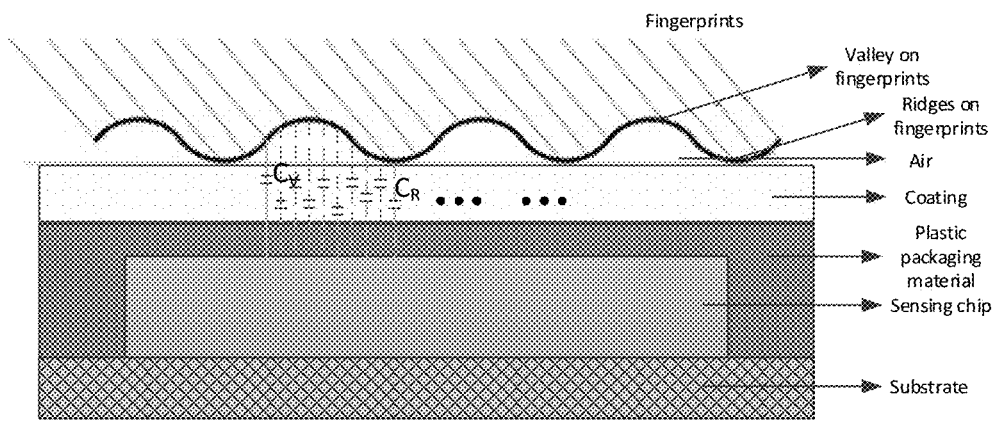
FIG. 1 is a schematic principle diagram of fingerprint detection by a conventional fingerprint identification apparatus for a dry finger.
Figure 2:
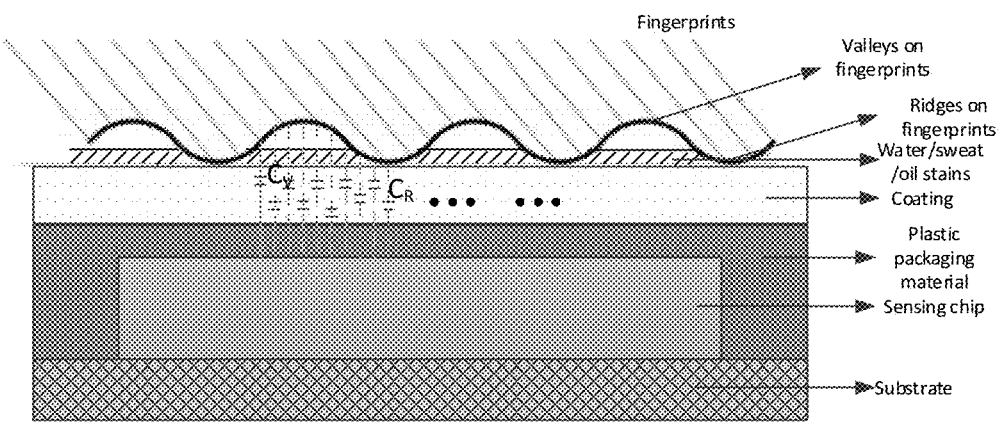
FIG. 2 is a schematic principle diagram of fingerprint detection by the conventional fingerprint identification apparatus for a wet finger.
Figure 3:
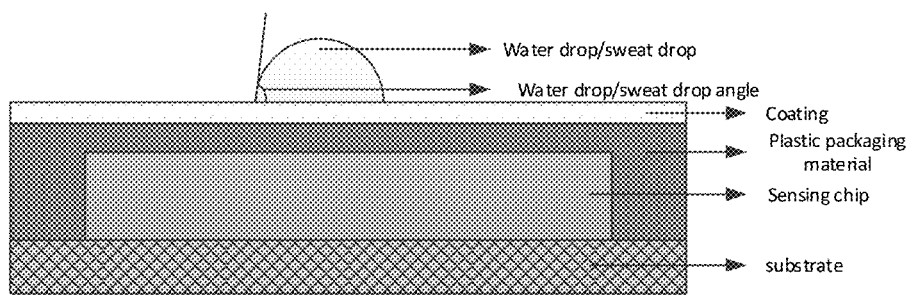
FIG. 3 is a schematic diagram of a water drop angle/a sweat drop angle of fingerprint detection by the conventional fingerprint identification apparatus for a wet finger.
Figure 4:
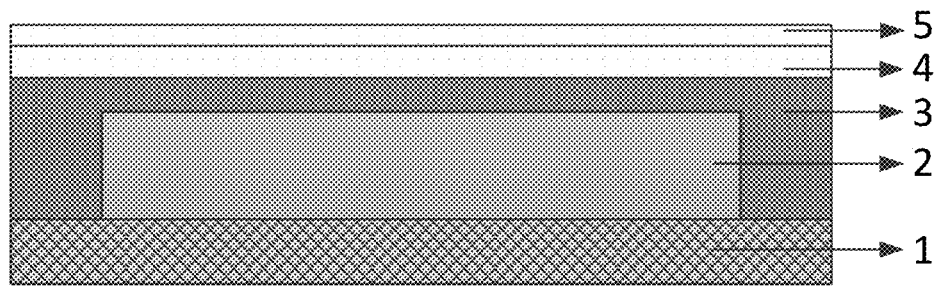
FIG. 4 is a schematic structural diagram of a fingerprint identification apparatus according to a first embodiment of the present disclosure.

FIG. 4 is a schematic structural diagram of a fingerprint identification apparatus according to a first embodiment of the present application. The fingerprint identification apparatus according to the first embodiment of the present disclosure includes: a substrate 1, a sensing chip 2, a plastic packaging material 3, a first covering layer 4, and a second covering layer 5. The sensing chip 2 is packaged on the substrate 1 using the plastic packaging material 3. The first covering layer 4 is coated over the sensing chip 2. The second covering layer 5 is coated on an upper surface of the first covering layer 4. The second covering layer 5 is an oleophobic and hydrophobic coating.

In the first embodiment of the present disclosure, the first covering layer 4 may be a surface hardened layer or a cover. That is, the present disclosure may be simultaneously applicable to a coating fingerprint identification apparatus, and a cover fingerprint identification apparatus manufactured from glass, ceramic, sapphire or other materials.

In the first embodiment of the present disclosure, the second covering layer 5 is made from a fluoropolymer, for example, a perfluoropolyether, or other modified perfluoropolyethers having a —CF2-O—C—F2— perfluoropolyether main chain structure. Using the perfluoropolyether as an example, the second covering layer 5 is coated in the following manner: mixing a raw liquid of the perfluoropolyether with a solvent dipropylene glycol methyl ether at a ratio, and then uniformly spraying or evaporating the mixture on the upper surface of the first covering layer 4, resting the mixture for a period of time to fully cure the mixture to form the second covering layer; and increasing hydrophobic and oleophobic capabilities of the surface of the fingerprint identification apparatus by the second covering layer 5, and improving the fingerprint identification accuracy and fingerprint identification speed in a wet-finger use environment.

In the first embodiment of the present disclosure, the raw liquid of the perfluoropolyether and the solvent dipropylene glycol methyl ether are mixed at a ratio of 0.5 to 5:100, and the second covering layer has a thickness of several nanometers to several tens of nanometers, which does not affect the penetration of the sensing chip.

Preferably, in the first embodiment of the present disclosure, when the first covering layer is a surface hardened layer, a paint for preparing the surface hardened layer is added with a hydrophobic and oleophobic material. Preferably, the hydrophobic and oleophobic material comprises a silicone-modified resin or an organic fluorine-modified resin.

In the first embodiment of the present disclosure, when the first covering layer is a surface hardened layer, the first covering layer is prepared by: mixing the hydrophobic and oleophobic material with an inhibitor 4-methoxyphenol at a ratio and adding the mixture into the paint for preparing the surface hardened layer, and coating the paint with the mixture over the sensing chip and fully curing the paint with the mixture, to form the first covering layer. Preferably, the hydrophobic and oleophobic material, the inhibitor 4-methoxyphenol and the paint of the surface hardened layer are mixed at a ratio of 1 to 5:20:100.

Figure 5:
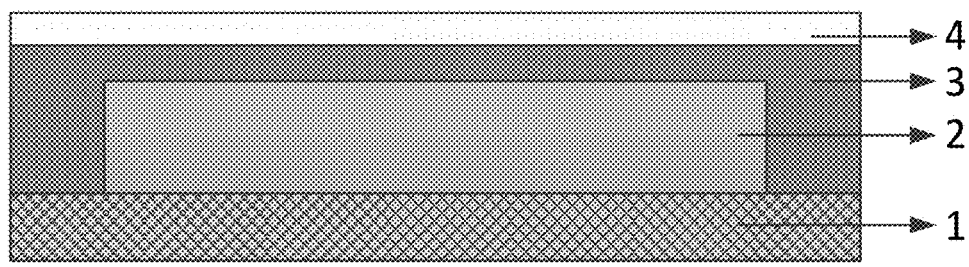
FIG. 5 is a schematic structural diagram of a fingerprint identification apparatus according to a second embodiment of the present disclosure.

FIG. 5 is a schematic structural diagram of a fingerprint identification apparatus according to a second embodiment of the present application. The fingerprint identification apparatus according to the second embodiment of the present disclosure includes: a substrate 1, a sensing chip 2, a plastic packaging material 3, and a first covering layer 4. The sensing chip 2 is packaged on the substrate 1 using the plastic packaging material 3. The first covering layer 4 is coated over the sensing chip 2. The first covering layer 4 is a surface hardened layer with a hydrophobic and oleophobic material added.

In the second embodiment of the present disclosure, the hydrophobic and oleophobic material added to the surface hardened layer includes a silicone-modified resin, an organic-fluorine modified resin or other conventional fluorine-modified resins that are better compatible with the paint system of the surface hardened layer. Using the scenario where the organic fluorine-modified acrylate is used as the hydrophobic and oleophobic material as an example, the first covering layer 4 is prepared by: mixing the organic fluorine-modified acrylate with an inhibitor 4-methoxyphenol at a ratio and adding the mixture into the paint for preparing the surface hardened layer, and coating the paint with the mixture over the sensing chip 2 and resting the mixture for a period of time to fully cure the paint with the mixture, to form the first covering layer.

In the second embodiment of the present disclosure, organic fluorine-modified acrylate, the inhibitor 4-methoxyphenol and the paint of the surface hardened layer are mixed at a ratio of 1 to 5:20:100.

Figure 6:
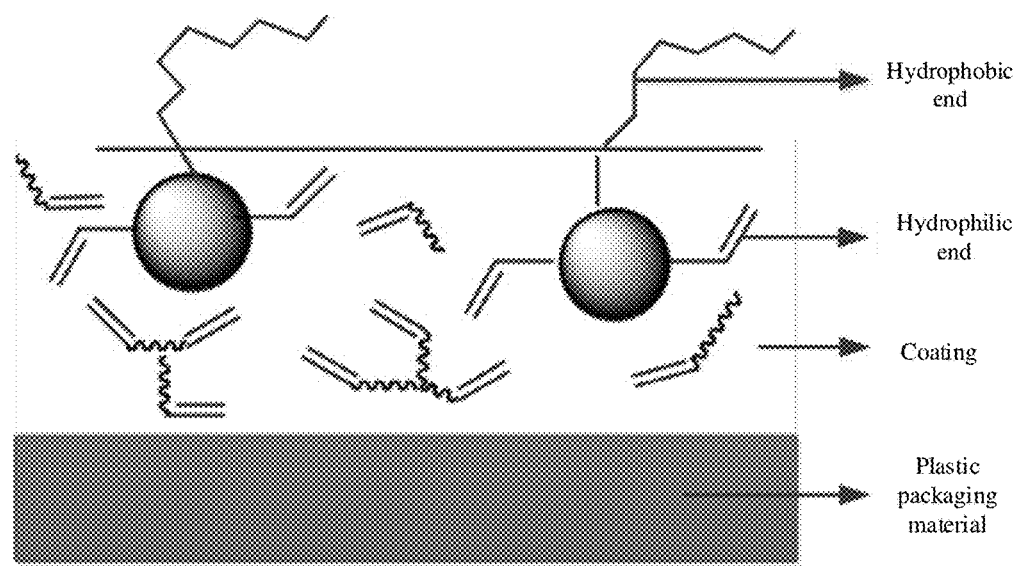
FIG. 6 is a schematic diagram before an organic fluorine-modified acrylate is reacted with a paint of a surface hardened layer.
Figure 7:
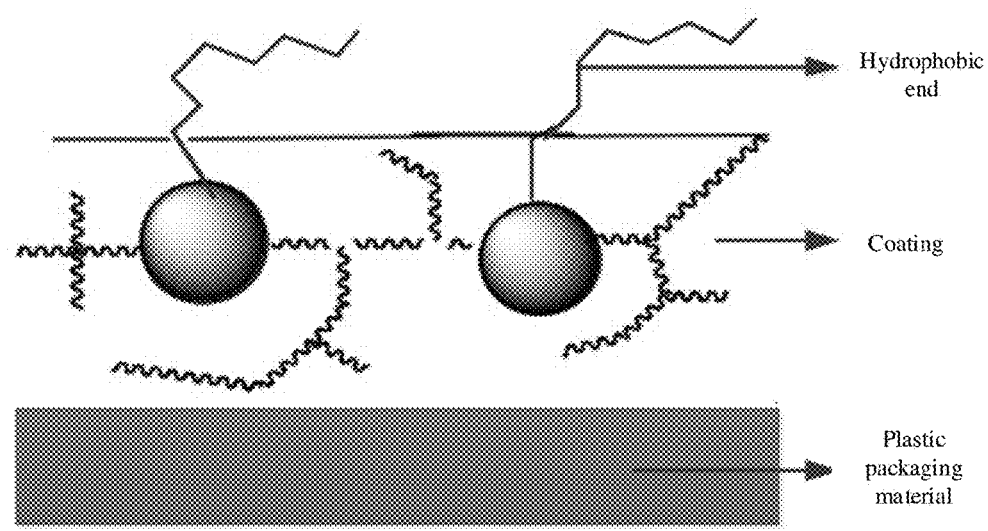
FIG. 7 is a schematic diagram after the organic fluorine-modified acrylate is reacted with the paint of the surface hardened layer.

Referring to both FIG. 6 and FIG. 7, FIG. 6 is a schematic diagram before the organic fluorine-modified acrylate is reacted with the paint of the surface hardened layer, and FIG. 7 is a schematic diagram after the organic fluorine-modified acrylate is reacted with the paint of the surface hardened layer. During curing of the mixed paint, hydrophilic ends of the organic fluorine-modified acrylate bind, via molecular bonds, the molecules in the paint of the surface hardened layer and are thus fixed. Hydrophobic ends modified by fluorine are excluded, and surface directivity is exhibited, such that density of the hydrophobic components of the first covering layer is increased. In this way, the hydrophobic and oleophobic capabilities of the first covering layer are improved. In addition, since the hydrophilic ends of the organic fluorine-modified acrylate bind, via molecular bonds, the molecules in the paint of the surface hardened layer, the binding is very secure and the wear-resistant property thereof is good. This ensures that the fingerprint identification accuracy and speed are still high even the fingerprint identification apparatus is used by a wet finger for a long time.

In the second embodiment of the present disclosure, when the hydrophobic and oleophobic material is added to the paint for preparing the surface hardened layer, the thickness of the surface hardened layer may not be increased while the accuracy of the fingerprint identification apparatus is improved, and the penetration of the sensing chip is not affected.

Figure 8:
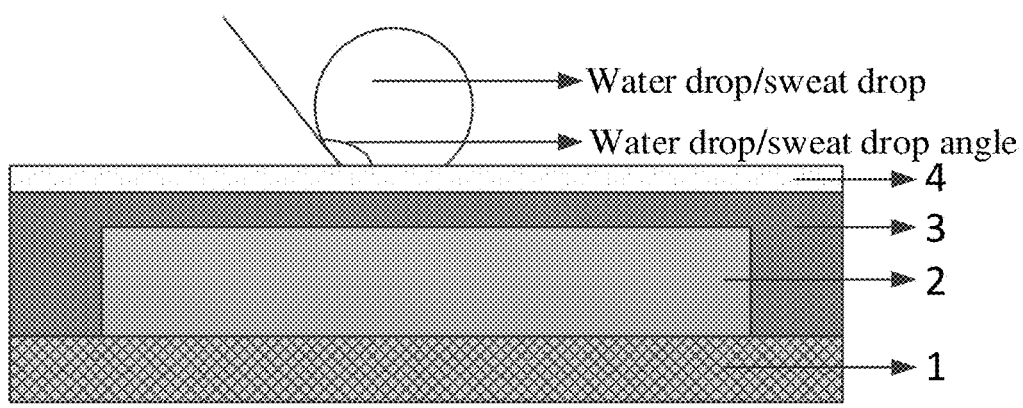
FIG. 8 is a schematic diagram of a water drop angle/a sweat drop angle of fingerprint detection by the fingerprint identification apparatus for a wet finger according to an embodiment of the present disclosure.

The fingerprint identification apparatus according to the embodiment of the present disclosure detects fingerprints of a wet finger based on the following principle: when the wet finger is pressed on the surface of the fingerprint identification apparatus, the recesses of the fingerprints are filled with water, sweat, oil stains or the like, and the water, sweat or oil stains may be spread on the surface of the fingerprint identification apparatus. Since the water drop angle/sweat drop angle is great, the contact area between the water, sweat or oil stains and the surface of the fingerprint identification apparatus is relatively smaller, and thus the affected sensing region becomes smaller. In this way, a fingerprint image may be more clearly and quickly recovered and identified, such that the fingerprint identification accuracy and fingerprint identification speed of the wet finger are improved. Specifically, FIG. 8 is a schematic diagram of a water drop angle/a sweat drop angle of fingerprint detection by the fingerprint identification apparatus for a wet finger according to an embodiment of the present disclosure.

In the fingerprint identification apparatus according to the embodiment of the present disclosure, a hydrophobic and oleophobic coating is arranged on the surface of the fingerprint identification apparatus or a hydrophobic and oleophobic material is added to the paint for preparing the surface hardened layer, such that the density of the hydrophobic components on the surface of the fingerprint identification apparatus is increased. In this way, the hydrophobic and oleophobic capabilities of the surface of the fingerprint identification apparatus are enhanced, and thus the fingerprint identification accuracy and fingerprint identification speed in a wet-finger use environment are improved. In addition, the wear-resistant property of the surface of the fingerprint identification apparatus is improved.

Detailed above are exemplary implementation manners of the present disclosure, but the implementation manners of the present disclosure are not limited by the above embodiments. Any change, modification, replacement, combination, and simplification made within the spirit and principle of present disclosure should be equivalent displacement manners, and shall fall within the protection scope of the present disclosure.

What is claimed is:

1. A fingerprint identification apparatus, comprising: a substrate, a sensing chip, a first covering layer, and a second covering layer; wherein the sensing chip is arranged on the substrate, the first covering layer is coated over the sensing chip, the second covering layer is coated on an upper surface of the first covering layer, and the second covering layer is an oleophobic and hydrophobic coating;
wherein, the first covering layer comprises a surface hardened layer, a paint for preparing the surface hardened layer is added with a hydrophobic and oleophobic material, the hydrophobic and oleophobic material comprises a silicone-modified resin or an organic fluorine-modified resin.

2. The fingerprint identification apparatus according to claim 1, wherein the second covering layer is made from a fluoropolymer.

3. The fingerprint identification apparatus according to claim 2, wherein the second covering layer is prepared by: mixing a raw liquid of the fluoropolymer with a solvent dipropylene glycol methyl ether at a ratio, and then uniformly spraying or evaporating the mixture on the upper surface of the first covering layer and fully curing the mixture to form the second covering layer.

4. The fingerprint identification apparatus according to claim 3, wherein the raw liquid of the fluoropolymer and the solvent dipropylene glycol methyl ether are mixed at a ratio of 0.5 to 5:100.

5. The fingerprint identification apparatus according to claim 1, wherein the first covering layer is prepared by: mixing the hydrophobic and oleophobic material with an inhibitor 4-methoxyphenol at a ratio and adding the mixture into the paint for preparing the surface hardened layer, and coating the paint with the mixture over the sensing chip and fully curing the paint with the mixture, to form the first covering layer.

6. The fingerprint identification apparatus according to claim 5, wherein the hydrophobic and oleophobic material, the inhibitor 4-methoxyphenol and the paint of the surface hardened layer are mixed at a ratio of 1 to 5:20:100.

7. The fingerprint identification apparatus according to claim 1, further comprising a plastic packaging material; wherein the sensing chip is packaged on the substrate using the plastic packaging material.

* * * * *